ID1 United States Patent US 10,286,833 B2
Nakamura et al. May 14, 2019

(54) CONTROL DEVICE FOR VEHICULAR LAMP AND VEHICLE LIGHTING SYSTEM

(71) Applicant: Stanley Electric Co., Ltd., Tokyo (JP)

(72) Inventors: Shigekatsu Nakamura, Tokyo (JP); Yusuke Hirai, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 15/982,162

(22) Filed: May 17, 2018

(65) Prior Publication Data
US 2018/0334083 A1    Nov. 22, 2018

(30) Foreign Application Priority Data
May 19, 2017 (JP) .................. 2017-100171

(51) Int. Cl.
  B60Q 1/115 (2006.01)
  B60Q 1/14 (2006.01)
  B60Q 1/12 (2006.01)
  B60Q 1/076 (2006.01)

(52) U.S. Cl.
  CPC .............. B60Q 1/115 (2013.01); B60Q 1/076 (2013.01); B60Q 1/12 (2013.01); B60Q 1/143 (2013.01); B60Q 2300/112 (2013.01); B60Q 2300/114 (2013.01)

(58) Field of Classification Search
  None
  See application file for complete search history.

(56) References Cited

U.S. PATENT DOCUMENTS

| 7,747,367 B2 | 6/2010 | Ono |
| 8,352,119 B2 | 1/2013 | Arai et al. |
| 2012/0101692 A1* | 4/2012 | Kasaba ............... B60Q 1/10 701/49 |

(Continued)

FOREIGN PATENT DOCUMENTS

| EP | 2963385 A1 | 1/2016 |
| JP | 2009-126268 A | 6/2009 |

(Continued)

OTHER PUBLICATIONS

The extended European Search Report for the related European Patent Application No. 18172758.7 dated Oct. 26, 2018.

*Primary Examiner* — Jany Richardson
(74) *Attorney, Agent, or Firm* — Kenealy Vaidya LLP

(57) ABSTRACT

To provide a technique capable of accurately obtaining the attitude of a vehicle in the pitch direction. A device controls the optical axis of a vehicular lamp in accordance with an attitude change in pitch direction of the vehicle having (a) an angle calculation part which obtains a first acceleration value, a second acceleration value, and a vehicle speed, at each predetermined time intervals respectively, calculates vehicle traveling direction acceleration based on the vehicle speed, further obtains a first slope and a second slope from the correlation between the vehicle traveling direction acceleration and the first and the second acceleration value respectively, and a vehicle attitude angle based on the ratio between the two slopes, and (b) an optical axis setting part which generates a control signal for controlling the optical axis of the lamp based on the vehicle attitude angle, and provides the control signal to the lamp.

14 Claims, 4 Drawing Sheets

(56) References Cited

U.S. PATENT DOCUMENTS

2017/0129390 A1   5/2017   Akaza et al.

FOREIGN PATENT DOCUMENTS

| JP | 2013-112267 A | 6/2013 |
| JP | 5577080 B2 | 8/2014 |
| JP | 5787649 B2 | 9/2015 |
| WO | 2016/114159 A1 | 7/2016 |

\* cited by examiner

CONTROL DEVICE FOR VEHICULAR LAMP AND VEHICLE LIGHTING SYSTEM

BACKGROUND OF THE INVENTION

Field of the Invention

The present invention relates to a technique for controlling light irradiation direction by a vehicular lamp (for example, a pair of lamp units) corresponding to an attitude change of a vehicle.

Description of the Background Art

Automatic leveling control for adjusting irradiation direction of light (or the optical axis) of headlamps corresponding to the attitude change of a vehicle in the pitch direction due to occupants or load is known. According to such automatic leveling control, it is possible to prevent glaring an oncoming vehicle or a preceding vehicle even when the attitude of the vehicle changes.

Prior art for achieving automatic leveling control in a moving vehicle is disclosed in Japanese Patent No. 5577080 (hereinafter referred to as Patent Document 1), for example. In the technique disclosed in Patent Document 1, angle of inclination is obtained by performing a predetermined calculation using acceleration values in the horizontal direction and the vertical direction of the vehicle obtained by a two-axis acceleration sensor installed in the vehicle, and the irradiation direction of the light is controlled based on the angle of inclination.

Further, in the technique disclosed in Japanese Patent No. 5787649 (hereinafter referred to as Patent Document 2), acceleration values in the horizontal direction of a vehicle obtained by an acceleration sensor installed in a vehicle is represented on the first axis, and acceleration values in the vertical direction is represented on the second axis, and plots the detected acceleration values in each direction thereby obtaining a straight line from the detection values, and controls the irradiation direction of light based on the slope of the straight line.

However, since the acceleration values outputted from the acceleration sensor in the moving vehicle have a relatively large variation, the calculated attitude angle in the pitch direction of the vehicle based on these acceleration values is also susceptible to variations resulting in a low accuracy of the obtained attitude angle.

In a specific aspect, it is an object of the present invention to provide a technique capable of obtaining the attitude of the vehicle in the pitch direction more accurately.

SUMMARY OF THE INVENTION

[1] A control device for a vehicular lamp according to one aspect of the present invention is a control device which variably controls optical axis of the vehicular lamp in accordance with an attitude change in the pitch direction of a vehicle including (i) an angle calculation part where: the angle calculation part obtains a first acceleration value associated with the horizontal direction of the vehicle, a second acceleration value associated with the vertical direction of the vehicle, and a vehicle speed, at each predetermined time intervals, respectively; the angle calculation part calculates a vehicle traveling direction acceleration based on the vehicle speed; the angle calculation part further obtains a first slope from a correlation between the vehicle traveling direction acceleration and the first acceleration value, and a second slope from a correlation between the vehicle traveling direction acceleration and the second acceleration value, and an attitude angle of the vehicle based on the ratio between the first slope and the second slope; and (ii) an optical axis setting part which generates a control signal for controlling the optical axis of the vehicular lamp based on the attitude angle of the vehicle obtained by the angle calculation part, and provides the control signal to the vehicular lamp.

[2] A vehicular lamp system according to one aspect of the present invention is a vehicular lamp system including the above-described control device and a vehicle lamp controlled by the control device.

According to the above configuration, the attitude of the vehicle in the pitch direction can be obtained more accurately.

DESCRIPTION OF THE PREFERRED EMBODIMENTS

Figure 1:
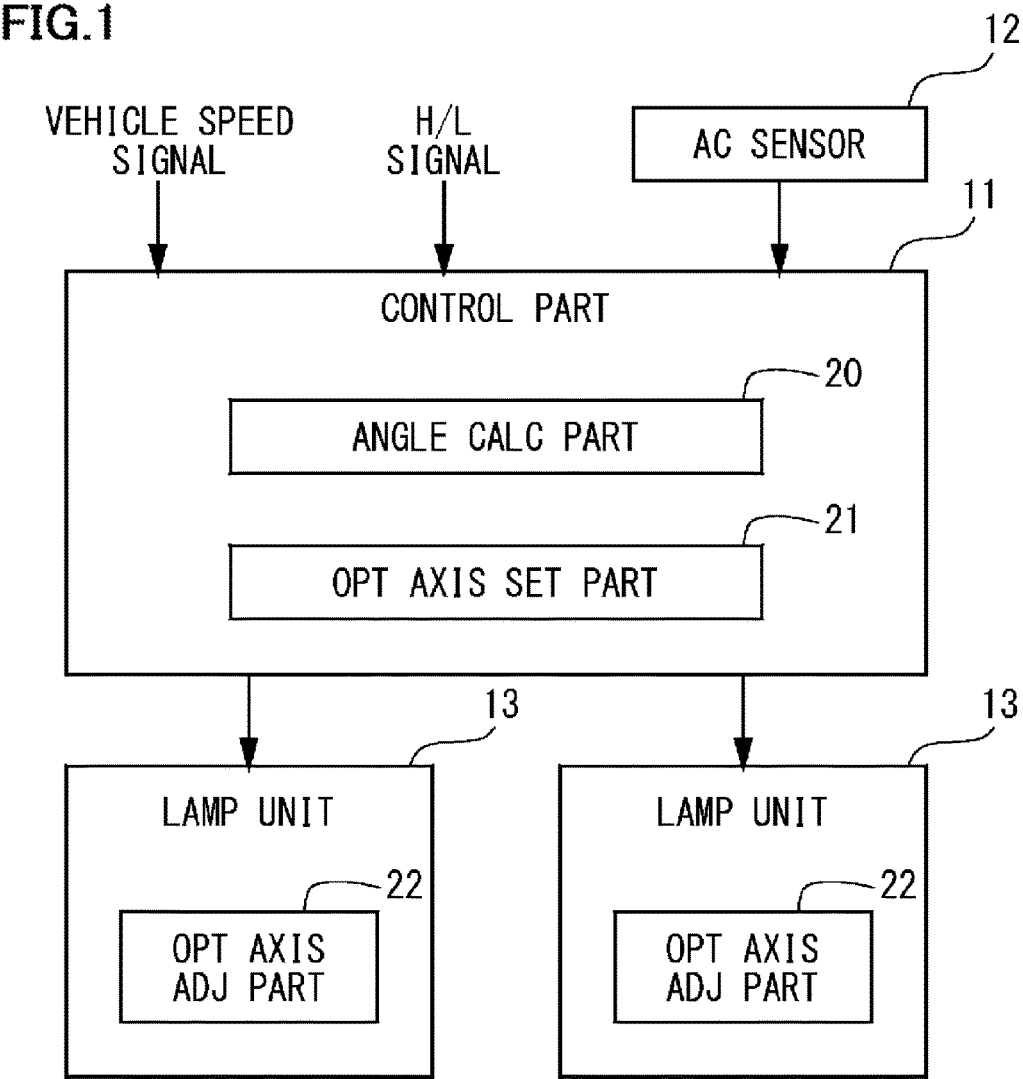
FIG. 1 is a block diagram showing a configuration of a vehicular lamp system according to one embodiment.
Figure 2:
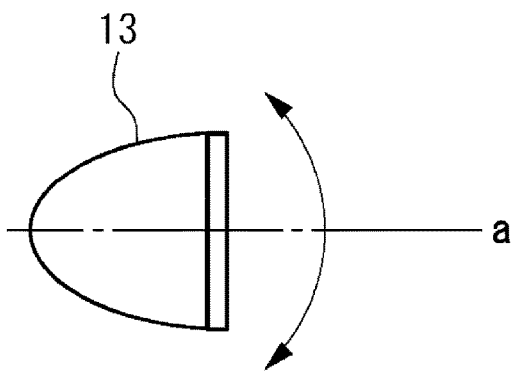
FIG. 2 is a figure schematically showing the state of optical axis control of the lamp unit.

FIG. 1 is a block diagram showing a configuration of a vehicular lamp system according to one embodiment. The vehicular lamp system shown in FIG. 1 includes a control part 11, an acceleration sensor 12 (abbreviated as AC SENSOR in FIG. 1), and two lamp units 13. As schematically shown in FIG. 2, this vehicular lamp system variably controls the light irradiation direction a (optical axis a) by each lamp unit 13 during vehicle travel in accordance with the attitude change of the vehicle in the pitch direction.

The control part 11 controls the operation of the vehicular lamp system, and is configured to include an angle calculation part 20 (abbreviated in FIG. 1 as ANGLE CALC PART) and an optical axis setting part 21 (abbreviated as OPT AXIS SET PART in FIG. 1). The control part 11 carries out a predetermined operation program in a computer system comprising a CPU, ROM, RAM, and the like, for example.

The acceleration sensor 12 is a sensor capable of detecting at least accelerations in the direction of two mutually orthogonal axes and is installed at a predetermined position in the vehicle. This acceleration sensor 12 is installed in the vehicle so that the axial direction of one axis matches the front-to-rear direction (the horizontal direction) of the vehicle and the axial direction of the other axis matches the up-and-down direction (the vertical direction) of the vehicle, for example.

Each of the lamp units 13 is installed at a predetermined position in the front portion of the vehicle, and is configured to have a light source, a reflecting mirror, and the like for irradiating the front of the vehicle with light. Each lamp unit 13 has an optical axis adjusting part 22 (abbreviated as OPT AXIS ADJ PART in FIG. 1) for adjusting the optical axis a up and down in the pitch direction of the vehicle. Each optical axis adjusting part 22 has, for example, an actuator for vertically adjusting the direction of the light source of each lamp unit 13, and operates based on a control signal provided from the control part 11.

Based on the vehicle speed value obtained from a vehicle speed sensor installed in the vehicle which is not shown in the figure and the acceleration values obtained from the acceleration sensor 12, the angle calculation part 20 calculates an attitude angle (a vehicle angle) which is the information indicating the attitude in the pitch direction of the vehicle.

Based on the attitude angle calculated by the angle calculation part 20, the optical axis setting part 21 generates a control signal for controlling the optical axis a of each lamp unit 13, and provides the control signal to each lamp unit 13.

Figure 3A:
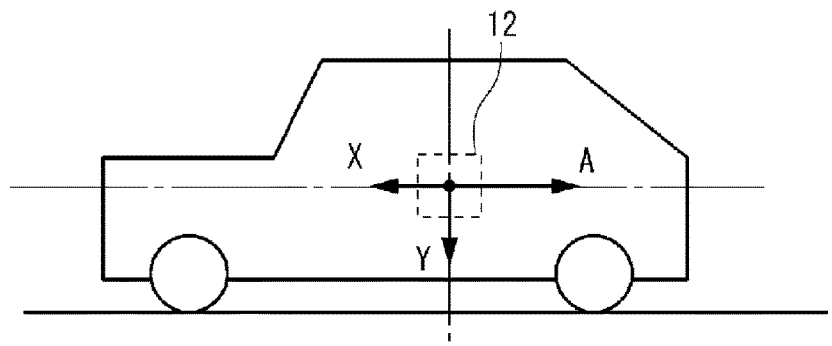
FIGS. 3A and 3B are figures for explaining the installation state of the acceleration sensor.
Figure 3B:
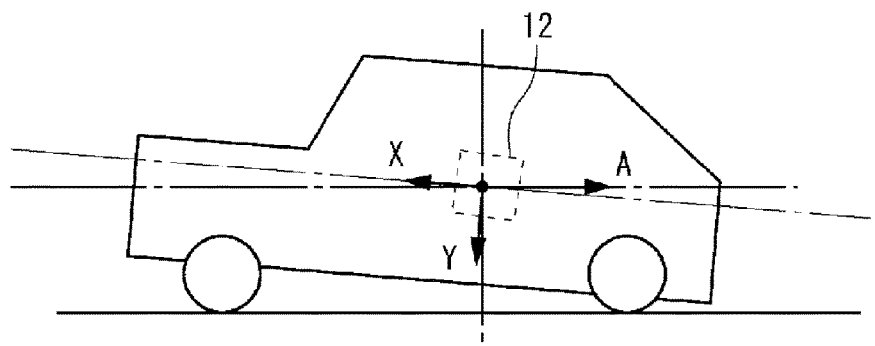

FIGS. 3A and 3B are figures for explaining the installation state of the acceleration sensor. As shown in FIG. 3A, in the present embodiment, in order to simplify the description, it is assumed that the acceleration sensor 12 is disposed so that the axial direction of the X axis which is the first axis of the acceleration sensor 12 matches the front-to-rear direction (the horizontal direction) of the vehicle, and the axial direction of the Y axis which is the second axis of the acceleration sensor 12 matches the up-and-down direction (the vertical direction) of the vehicle. Also, the vector denoted by A in FIG. 3A indicates the acceleration in the direction of travel of the vehicle which is hereinafter referred to as "vehicle traveling direction acceleration A". In the present embodiment, the vehicle traveling direction acceleration A is obtained based on the vehicle speed information.

Figure 4:
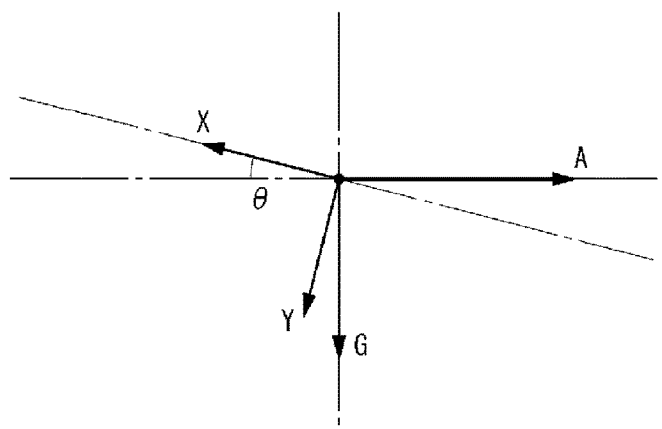
FIG. 4 is an enlarged view showing the relationship between each axis of the acceleration sensor and the acceleration in the direction of vehicle travel.

FIG. 3B shows the state of the vehicle attitude change where the rear portion of the vehicle relatively moves downward and the front portion relatively moves upward due to the influence of the occupant, cargo or the like. In this case, while the vehicle is traveling, as shown in the figure, the X axis and the Y axis of the acceleration sensor 12 are inclined as the attitude of the vehicle changes, but the direction of the vehicle traveling direction acceleration A does not incline and remains parallel to the road surface on which the vehicle is positioned. FIG. 4 shows this relationship in an enlarged manner. As shown in the figure, the angle θ formed between the direction parallel to the road surface and the front-to-rear direction of the vehicle corresponds to the attitude angle of the vehicle. This relationship applies not only to a road where its surface is horizontal, but also where its surface is inclined which is not shown in the figure.

Figure 5:
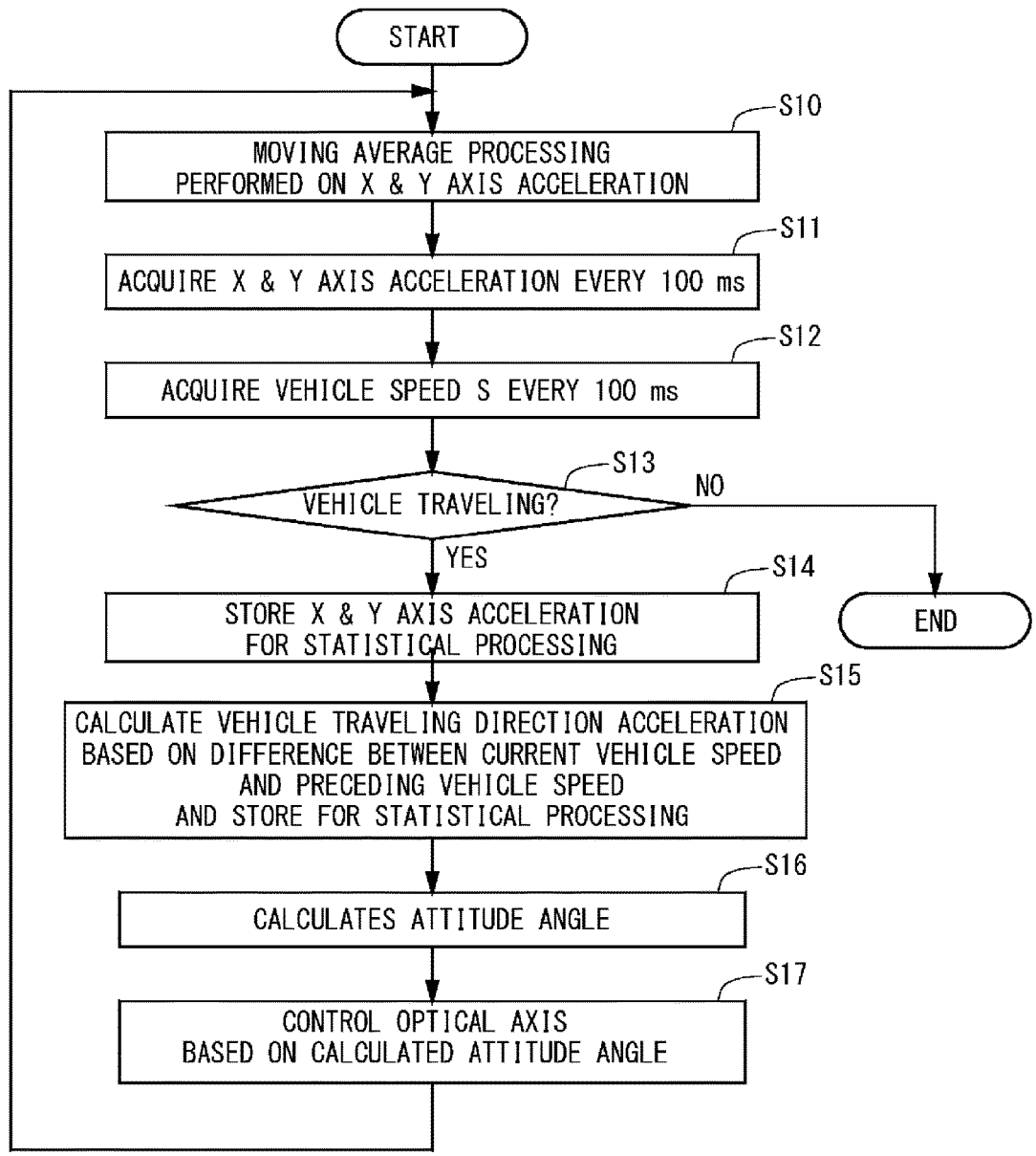
FIG. 5 is a flowchart for explaining the operation of the vehicular lamp system.

FIG. 5 is a flowchart for explaining the operation of the vehicular lamp system. Here, processing contents of the control part 11 is mainly shown. Further, the sequence of each processing block shown here may be changed as long as no inconsistency occurs among them. In addition, an example where angle calculation is performed by statistical processing is also specifically explained in the following description.

The angle calculation part 20 acquires the X, Y axis acceleration values outputted from the acceleration sensor 12 and performs moving average processing on these values (step S10). For example, the X, Y axis acceleration values outputted from the acceleration sensor 12 are acquired every 1 ms (millisecond), and moving average processing is performed on these values.

Further, every 100 ms, the angle calculation part 20 acquires each of X, Y axis acceleration values obtained by the moving average processing (step S11), and further acquires the vehicle speed S obtained from the vehicle every 100 ms (step S12). Here, the time interval 100 ms for acquiring each acceleration value and vehicle speed is an example, and is not limited thereto. The time interval for acquiring each acceleration value and the vehicle speed may be different.

Next, based on the magnitude of the vehicle speed S, the angle calculation part 20 determines whether or not the vehicle is traveling (step S13). If the vehicle is not traveling (step S13; NO), then the process is terminated. In this case, for example, although illustration and detailed explanation are omitted, the process proceeds to an optical axis adjustment routine which is executed only during vehicle stop.

If the vehicle is traveling (step S13; YES), then the angle calculating part 20 stores each of the X, Y axis acceleration values in a buffer for statistical processing (step S14). Further, the angle calculation part 20 calculates the vehicle traveling direction acceleration Sv based on the difference between the current vehicle speed Sn and the vehicle speed preceding the current speed Sn−1, and stores this value in the buffer for statistical processing (step S15). Specifically, as the vehicle traveling direction acceleration Sv is determined on the basis of the vehicle speed, since there is time deviation between the vehicle traveling direction acceleration and the X, Y axis acceleration values, by storing each value in the buffer taking into account this deviation, it possible to synchronize the vehicle traveling direction acceleration Sv with the time axis of the X, Y axis acceleration values. In the present embodiment, the vehicle traveling direction acceleration Sv obtained from the vehicle speed is used as the above-described vehicle traveling direction acceleration A.

Next, by performing statistical processing including a predetermined calculation using the vehicle traveling direction acceleration Sv (the vehicle traveling direction acceleration A) and each X, Y axis acceleration value stored in the buffer, the angle calculation part 20 calculates the attitude angle of the vehicle. (step S16).

Figure 6A:
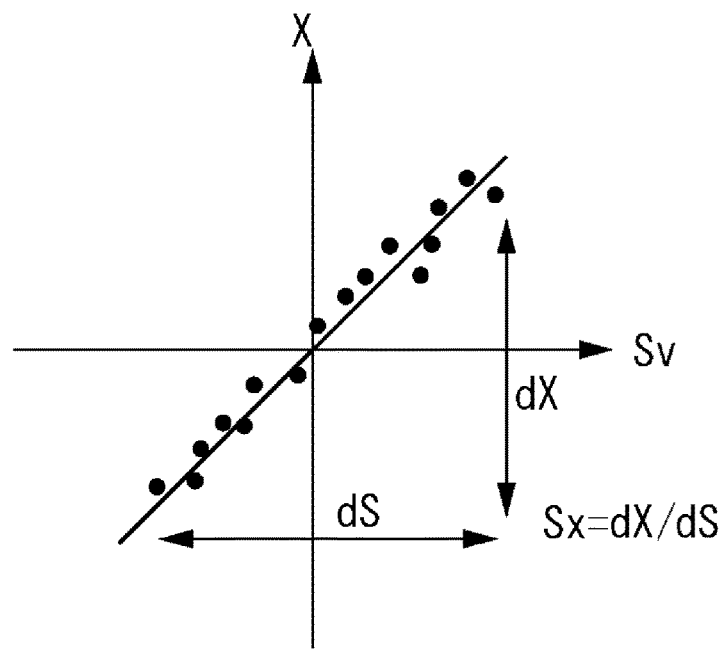
FIGS. 6A and 6B are graphs for explaining the contents of statistical processing performed by the angle calculation part.
Figure 6B:
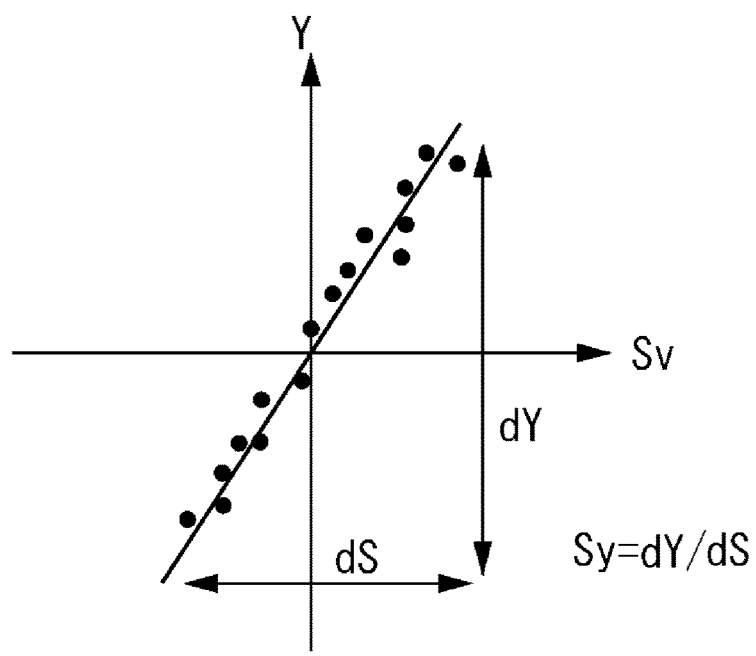

FIGS. 6A and 6B are graphs for explaining the contents of statistical processing performed by the angle calculation part. As shown in FIG. 6A, the horizontal axis (the first axis) represents the vehicle traveling direction acceleration Sv and the vertical axis (second axis) represents the X axis acceleration, and by plotting the respective values and establishing a correlation between them, a slope $S_x$ (=dX/dS) is obtained by linear approximation by a least-squares method, for example. Similarly, as shown in FIG. 6B, the horizontal axis (the first axis) represents the vehicle traveling direction acceleration Sv and the vertical axis (second axis) represents the Y axis acceleration, and by plotting the respective values and establishing a correlation between them, the slope $S_y$ (=dY/dS) is obtained by linear approximation by the least-squares method, for example. Then, the angle calculating part 20 calculates arctan ($S_y/S_x$) using the ratio of the obtained slopes $S_x$ and $S_y$ to achieve the attitude angle θ of the vehicle.

In other words, the slope $S_x$ (=dX/dS) is obtained from the X axis acceleration value in relation to the vehicle traveling direction acceleration $S_v$ (vehicle traveling direction acceleration A). Here, the X axis acceleration value is the acceleration in the front-to-rear direction of the vehicle. Similarly, the slope $S_y$ (=dY/dS) is obtained from the Y axis acceleration value in relation to the vehicle traveling direction acceleration $S_v$ (vehicle traveling direction acceleration A). Here, the Y axis acceleration value is the acceleration in the up-and-down direction of the vehicle. Since both the slope $S_x$ and the slope $S_y$ are ratios in reference to the vehicle traveling direction acceleration $S_v$ (vehicle traveling direction acceleration A), the attitude angle θ of the vehicle can be calculated by the ratio of the slope $S_x$ and the slope $S_y$.

When the attitude angle θ of the vehicle is calculated, based on this attitude angle θ, the optical axis setting part 21 in the control part 11 generates a control signal for controlling the optical axis a of each lamp unit 13 and outputs it to each lamp unit 13 (step S17). In each lamp unit 13, the optical axis adjusting part 22 adjusts the optical axis based on the control signal provided from the optical axis setting part 21. Thereafter, the process returns to step S10, and the subsequent processes are repeated.

According to the above-described embodiment, it is possible to achieve a more accurate control technique for a vehicular lamp system capable of obtaining the attitude of the vehicle in the pitch direction. Specifically, since the vehicle traveling direction acceleration is obtained from the vehicle speed where its data is relatively stable, it is possible to obtain a stable data of the vehicle traveling direction acceleration with less variation. Then, since the slope is obtained from the vehicle traveling direction acceleration data in relation to each of the X, Y axis acceleration values obtained from the acceleration sensor, and since the attitude angle of the vehicle is obtained from the slope, it is possible to alleviate the influence of variations in the data obtained from the acceleration sensor.

Further, since the slope is derived from the vehicle traveling direction acceleration in relation to each of the X, Y axis acceleration values obtained from the acceleration sensor, the X axis acceleration value and the Y axis acceleration value do not need to be obtained from the same time series. Due to this also, it is possible to alleviate the influence of variations in the data obtained from the acceleration sensor.

Furthermore, in the present embodiment, since the vehicle traveling direction acceleration $S_v$ obtained from the vehicle speed is used as the vehicle traveling direction acceleration A, and the attitude angle is calculated using the ratio with respect to this vehicle traveling direction acceleration, it is not necessary to install the acceleration sensor such that the direction of the X axis acceleration matches the front-to-rear direction of the vehicle and the direction of the Y axis acceleration matches the up-and-down direction of the vehicle. Accordingly, since the installation of the acceleration sensor to the vehicle may be carried out without consideration of mounting it with high accuracy, while reducing the installation cost as a whole, the attitude angle of the vehicle can be obtained.

Next, another embodiment will be described. In the preceding embodiment, the vehicle speed was always used to obtain the vehicle traveling direction acceleration, and using the ratio in reference to this vehicle traveling direction acceleration, the attitude angle of the vehicle was calculated. In the following embodiment, while the vehicle traveling direction acceleration obtained from the vehicle speed is used, a different method is used to obtain the attitude angle of the vehicle.

When the vehicle is traveling at a constant velocity, no acceleration in front-to-rear direction occurs, that is, the vehicle traveling direction acceleration A becomes 0 (zero). On the other hand, the acceleration in the up-and-down direction is deviated from the gravitational acceleration direction by the amount equivalent to the slope angle of the vehicle due to the load thereof. Here, when the attitude changes such that the front portion or the rear portion of the vehicle relatively moves downward due to the influence of the occupant, load or the like, a change occurs in the X, Y axis acceleration values outputted from the acceleration sensor 12. When the attitude change occurs, the absolute slope angle θ of the vehicle can be calculated by using the following formula disclosed in Patent Document 1, for example.

$$\theta = \arcsin\{X/(-1G)\}$$

Further, when an acceleration a is generated in the vertical direction, the formula becomes as follows.

$$\theta = \arcsin\{X/(-1G+a)\}$$

Also, a hill slope angle α can be calculated using the following formula disclosed in Patent Document 1, for example.

$$\alpha = \arcsin(h/x)$$

When applying these formulas, as X, which is the acceleration in front-to-rear direction detected from the acceleration sensor as described in Patent Document 1, the vehicle traveling direction acceleration obtained from the vehicle speed is to be used. Further, in the formulas, 1 G is the gravitational acceleration, h is the vertical directional displacement, and the lower-case x is the traveling distance.

By subtracting the hill slope angle from the absolute slope angle, the attitude angle can be calculated. Here, an absolute slope angle is defined as the angle of the vehicle with respect to the horizontal plane, a hill slope angle is defined as the angle of the slope (road surface) with respect to the horizontal plane, and an attitude angle is defined as the angle of the vehicle with respect to the slope (road surface). The absolute slope angle is equal to the sum of the hill slope angle and the attitude angle.

By using the vehicle traveling direction acceleration A obtained from the vehicle speed where its data is relatively stable, and not using the detected acceleration value X in front-to-rear direction from the acceleration sensor, it is possible to obtain a stable data of the vehicle traveling direction acceleration with less variation.

It should be noted that this invention is not limited to the subject matter of the foregoing embodiments, and can be implemented by being variously modified within the scope of the present invention as defined by the appended claims. For example, in the above-described embodiments, cases have been exemplified where the axial direction of the X axis of the acceleration sensor 12 matches the front-to-rear direction of the vehicle and the axial direction of Y axis matches the up-and-down direction of the vehicle. However, since the X axis and the Y axis of the sensor may be arranged to be inclined from the front-to-rear direction and the up-and-down direction of the vehicle, the installation of the sensor is not limited to the body of the vehicle and may be installed inside the lamp unit or the control part assembly as well. According to the present invention, even if there is a variation in the mounting direction of the acceleration sensor with respect to the vehicle, the attitude angle can be obtained. Therefore, even in the case where the acceleration sensor is installed inside the lamp unit which is mounted onto the vehicle, since the vehicle traveling direction acceleration is calculated using the value from the vehicle speed sensor, it is possible to calculate the attitude angle of the vehicle without being affected by the variation in the mounting direction of the acceleration sensor. In addition, if the acceleration sensor is integrally built in the lamp unit, the control part, or the like, then it becomes unnecessary to individually install the acceleration sensor to the body of the vehicle thereby reducing the installation work, and cost reduction can be achieved.

Further, in the above-described embodiments, the direction of the light source of each lamp unit is adjusted by an actuator, but the optical axis adjustment method is not limited thereto. For example, in a case where the light source of the lamp unit has a configuration in which a plurality of light-emitting elements are arranged in a matrix, by moving up and down the row of the light-emitting elements to be emitted according to the attitude angle, automatic leveling control can be achieved.

What is claimed is:

1. A control device for a vehicular lamp which variably controls optical axis of the vehicular lamp in accordance with an attitude change in the pitch direction of a vehicle comprising:
an angle calculation part;
wherein the angle calculation part obtains a first acceleration value associated with the horizontal direction of the vehicle, a second acceleration value associated with the vertical direction of the vehicle, and a vehicle speed, at each predetermined time intervals respectively, wherein the angle calculation part calculates a vehicle traveling direction acceleration based on said vehicle speed,
wherein the angle calculation part further obtains a first slope from a correlation between the vehicle traveling direction acceleration and the first acceleration value, a second slope from a correlation between the vehicle traveling direction acceleration and the second acceleration value, and an attitude angle of the vehicle based on the ratio between the first slope and the second slope, and
an optical axis setting part which generates a control signal for controlling the optical axis of the vehicular lamp based on the attitude angle of the vehicle obtained by the angle calculation part, and provides the control signal to the vehicular lamp, wherein
the angle calculation part obtains the attitude angle of the vehicle based on inverse sine function of the ratio between the first slope and the second slope.

2. The control device for a vehicular lamp according to claim 1,
wherein the first slope is obtained by linear approximation based on a correlation between the vehicle traveling direction acceleration and the first acceleration value, and
wherein the second slope is obtained by linear approximation based on a correlation between the vehicle traveling direction acceleration and the second acceleration value.

3. The control device for a vehicular lamp according to claim 2,
wherein the angle calculation part determines whether or not the vehicle is traveling and obtains the attitude angle of the vehicle when the vehicle is traveling.

4. The control device for a vehicular lamp according to claim 3,
wherein the angle calculation part obtains the vehicle traveling direction acceleration based on the difference of the vehicle speed at multiple time intervals.

5. The control device for a vehicular lamp according to claim 3,
wherein the first acceleration value and the second acceleration value are detected by an acceleration sensor.

6. The control device for a vehicular lamp according to claim 2,
wherein the angle calculation part obtains the vehicle traveling direction acceleration based on the difference of the vehicle speed at multiple time intervals.

7. The control device for a vehicular lamp according to claim 2,
wherein the first acceleration value and the second acceleration value are detected by an acceleration sensor.

8. The control device for a vehicular lamp according to claim 1,
wherein the angle calculation part determines whether or not the vehicle is traveling and obtains the attitude angle of the vehicle when the vehicle is traveling.

9. The control device for a vehicular lamp according to claim 8,
wherein the angle calculation part obtains the vehicle traveling direction acceleration based on the difference of the vehicle speed at multiple time intervals.

10. The control device for a vehicular lamp according to claim 8,
wherein the first acceleration value and the second acceleration value are detected by an acceleration sensor.

11. The control device for a vehicular lamp according to claim 1,
wherein the angle calculation part obtains the vehicle traveling direction acceleration based on the difference of the vehicle speed at multiple time intervals.

12. The control device for a vehicular lamp according to claim 1,
wherein the first acceleration value and the second acceleration value are detected by an acceleration sensor.

13. A vehicular lamp system including a control device according to claim 1 and a vehicle lamp controlled by the control device.

14. A vehicular lamp system including a control device which variably controls optical axis of the vehicular lamp in accordance with an attitude change in the pitch direction of a vehicle, a vehicle lamp controlled by the control device, an acceleration sensor, and a vehicle speed sensor comprising:
an angle calculation part;
wherein the angle calculation part obtains a first acceleration value associated with the horizontal direction of the vehicle, a second acceleration value associated with the vertical direction of the vehicle, and a vehicle speed, at each predetermined time intervals respectively, wherein the angle calculation part calculates a vehicle traveling direction acceleration based on said vehicle speed,
wherein the angle calculation part further obtains a first slope from a correlation between the vehicle traveling direction acceleration and the first acceleration value, a second slope from a correlation between the vehicle traveling direction acceleration and the second acceleration value, and an attitude angle of the vehicle based on the ratio between the first slope and the second slope, and
an optical axis setting part which generates a control signal for controlling the optical axis of the vehicular lamp based on the attitude angle of the vehicle obtained by the angle calculation part, and provides the control signal to the vehicular lamp, wherein
the angle calculation part obtains the attitude angle of the vehicle based on inverse sine function of the ratio between the first slope and the second slope.

* * * * *